United States Patent [19]

Pazos

[11] 4,281,089

[45] Jul. 28, 1981

[54] POLYURETHANE COMPOSITIONS AND PROCESS

[75] Inventor: José F. Pazos, Wilmington, Del.

[73] Assignee: E. I. Du Pont de Nemours and Company, Wilmington, Del.

[21] Appl. No.: 184,950

[22] Filed: Sep. 8, 1980

[51] Int. Cl.$^3$ .................. C08G 18/80; C08G 18/50; C08G 18/54

[52] U.S. Cl. .................. 525/456; 252/182; 528/44; 528/45; 560/26

[58] Field of Search .................. 528/45; 525/456; 252/182; 560/26

[56] References Cited

U.S. PATENT DOCUMENTS

| | | | |
|---|---|---|---|
| 3,069,379 | 12/1962 | Lavin et al. | 525/456 |
| 3,242,230 | 3/1966 | Habib | 525/456 |
| 3,345,237 | 11/1967 | Shaw | 525/456 |

*Primary Examiner*—H. S. Cockeram

[57] ABSTRACT

Polyurethane prepolymers having free isocyanate groups are treated with polyfunctional isocyanate-blocking agents to cause branching prior to or simultaneously with the addition of a curing diol. The composition containing the curing diol is molded in a conventional equipment at a conventional temperature, e.g., 100°–120°C. The resulting shaped article can be demolded in a fraction of the time required in the absence of the blocking agent. The shaped article is then postcured within a temperature range of about 25°–150° C., during which time the curing diol, if present in sufficient amount, displaces the blocking agent and forms a cured, linear polyurethane. A typical suitable blocking agent is a substantially uncrosslinked phenol/formaldehyde resin. The curable composition can be prepared in one step from the diisocyanate, glycol, and blocking agent; and a composition containing all the components, including the curing diol, can be prepared in one or more steps. If a nonbasic blocking agent is used in the presence of the curing diol, it is recommended to use a tertiary amine catalyst to selectively catalyze the blocking, rather than the curing, reaction. The cured linear polyurethanes have good physical properties, comparable with those of the prior art polyurethane elastomers. Partly crosslinked cured polyurethanes find utility where resistance to organic liquids is important.

21 Claims, No Drawings

4,281,089

POLYURETHANE COMPOSITIONS AND PROCESS

BACKGROUND OF THE INVENTION

This invention relates to new polyurethane compositions as well as to a process for curing polyurethane prepolymers.

Polyurethane elastomers have found wide application in the manufacture of articles that must be tough, flexible, and abrasion-resistant; for example, in shoe soles and heels, automobile tire sidewalls, industrial belts, and molded auto parts such as bumper inserts or covers. Normally, the polyurethane prepolymer, the curing agent, and the catalyst are well mixed, placed in a mold, and heated until at least substantial curing has taken place. At this point, the polyurethane article can be demolded without danger of loss of shape or of mechanical integrity and completely cured in an oven.

It is desirable to reduce the molding time as much as possible, so that the mold output can be increased. One way to achieve this goal is to use a small amount of a curing agent having more than two active hydrogen groups together with the normal curing agent having only two active hydrogen groups, usually a diol. Because the polyfunctional additive causes some crosslinking, gelling occurs quite readily, and the partly crosslinked polymer has sufficient mechanical strength to be able to withstand demolding and handling after a short residence in the mold. For many applications, however, a crosslinked polyurethane elastomer is less desirable because it has lower tear strength and elongation. It thus is important to reduce the polyurethane molding time without producing a highly crosslinked polyurethane elastomer.

SUMMARY OF THE INVENTION

According to the present invention, there is now provided a curable polyurethane prepolymer composition consisting essentially of a reaction product of the following components (A) and (C) with (B):

(A) 1 mole of a polymeric glycol having a number average molecular weight of about 400–3000;

(B) at least 1.3 moles of an organic diisocyanate; and (C) a blocking agent having at least three active hydrogen groups per molecule capable of reacting with isocyanate groups, the proportion of the blocking agent being about 0.01 to 0.15 active hydrogen equivalent per equivalent of isocyanate groups in excess of hydroxyl groups;

with the proviso that when the blocking agent is a phenol/aldehyde resin, its proportion is at most 5% by weight of component (A).

There also is provided a process for making cured polyurethane elastomer articles, wherein the following composition is first blended together and molded at a sufficiently high temperature to cause crosslinking of the prepolymer, thereby to impart to the shaped article adequate mechanical integrity to permit the article to be demolded prior to complete cure:

(A) 1 mole of a polymeric glycol having a number average molecular weight of about 400–3000;

(B) at least 1.3 moles of an organic diisocyanate;

(c) about 0.01 to 0.15 equivalent of an isocyanate-blocking agent having at least three active hydrogen groups per equivalent of isocyanate groups in excess of hydroxyl groups;

with the proviso that when the blocking agent is a phenol/aldehyde resin, its proportion is at most 5% by weight of component (A)

(D) a diol having aliphatic hydroxyl groups and a molecular weight of less than about 250, the amount of the diol being equivalent to at least 75%, but no more than about 120%, of the diisocyanate (B) in excess of the polymeric glycol (A);

then, the crosslinked molded article is demolded and maintained at a temperature of about 25°–150° C. until cure is completed;

with the proviso that, instead of a mixture of components (A), (B), (C), and (D), one can use a mixture of (D) or of (D) and one of (A) and (C) with the product of a one-step or a two-step reaction of the remaining components with one another.

DETAILED DESCRIPTION OF THE INVENTION

The compositions of the present invention can be made by combining the polymeric glycol, the diisocyanate, and the blocking agent either all at once or in a stepwise manner. For example, the glycol and the blocking agent can first be mixed together and then combined with the diisocyanate. Or, the diisocyanate and the glycol can first be made to react with each other, and the blocking agent is added last. Similarly, the blocking agent and the diisocyanate can be made to react first, and the glycol is added last. The preferred compositions of the present invention are those obtained by first making an isocyanate-terminated polyurethane prepolymer from the diisocyanate and the polymeric glycol, then combining this prepolymer with the isocyanate-blocking agent. Since the proportion of the blocking agent is quite small, the reaction product, even though branched, normally still is soluble in the reaction mixture, which remains fluid and pourable. When this fluid composition is mixed with the diol (D) and poured into a mold and heated to about 100°–120° C., further chain extension of the branched prepolymer takes place, so that the composition forms a three-dimensional network of good mechanical integrity. The shaped article can now be removed from the mold without danger of damage and left at ambient or higher temperature for several minutes or hours, preferably in an oven. This part of the cure following demolding can be referred to as post-cure. If the proportion of the diol is sufficient to displace the blocking agent, the blocked isocyanate groups now unblock and react with the hydroxyl groups of the diol. The completely cured polyurethane is completely or at least predominantly linear. The blocking agent or its thermal degradation product, which normally will be nonvolatile, remains in the cured polyurethane as a harmless, uniformly dispersed additive.

The preferred proportion of the diisocyanate in the compositions of the present invention is 1.5–6 moles per mole of polymeric glycol. Naturally, with increasing proportions of the diisocyanate, there will be an increasing amount of free diisocyanate in the compositions of the present invention in addition to the diisocyanate that will be chemically bound in the prepolymer by reaction with the polymeric glycol and polyfunctional blocking agent.

The polymeric glycols which are used in the practice of this invention include polyoxyalkylene ether glycols and polyester glycols. Glycols having number average molecular weights of about 600–2000 are especially effective in giving high quality polyurethanes. Illustrative of suitable polyoxyalkylene ether glycols are poly-1,2-propylene ether glycol, poly-1,3-propylene ether glycol and polytetramethylene ether glycol, the latter being especially preferred. Block and random copolymers of ethylene and propylene oxide are also useful, particularly ethylene oxide-capped polypropylene ether glycol. Polyoxyalkylene ether glycols can be prepared by condensing epoxides or other cyclic ethers, either by themselves or with simple diols, as is well known in the art.

Suitable polyesters include polycaprolactones and polyesters based on dicarboxylic acids, such as adipic, succinic and sebacic acids, and low molecular weight glycols such as ethylene glycol, propylene glycol, diethylene glycol, 1,4-butanediol and 1,6-hexanediol. The polycaprolactones are prepared by condensing caprolactone in the presence of minor amounts of difunctional active hydrogen compounds such as water or a low molecular weight glycol. Polyesters based on dicarboxylic acids and glycols can be made by well-known esterification or transesterification procedures. Polyesters based on mixtures of glycols and/or mixtures of diacids are useful because they often yield polyurethanes having good low temperature properties.

The organic diisocyanates which can be used to prepare the polyurethanes of this invention include aromatic and aliphatic (including cycloaliphatic) diisocyanates. Representative aromatic diisocyanates include 4,4'-methylenebis(phenyl isocyanate), 2,4- and 2,6-tolylene diisocyanate and mixtures thereof, 1,3- and 1,4-phenylene diisocyanate, 4,4'-methylenebis(o-tolyl isocyanate), 3,3'-dimethoxy-4,4'-biphenylene diisocyanate, and 4,4'-oxybis(phenyl isocyanate). Representative aliphatic isocyanates include hexamethylene diisocyanate, 1,3- and 1,4-cyclohexylene diisocyanate, 1,3- and 1,4-xylylene diisocyanates, 3,3,5-trimethyl-5-isocyanatomethylcyclohexyl isocyanate and 4,4'-methylenebis(cyclohexyl isocyanate). Preferred isocyanates include 4,4'-methylenebis (phenyl isocyanate), 2,4-tolylene diisocyanate and mixtures thereof with 2,6-tolylene diisocyanate, 4,4'-methylenebis(cyclohexyl isocyanate) and 3,3,5-trimethyl-5-isocyanatomethylcyclohexyl isocyanate. Especially preferred in the present invention is 4,4'-methylenebis (phenyl isocyanate), also known as MDI.

The diols used as curing agents in this invention can have primary or secondary aliphatic hydroxyl groups. Diols having primary hydroxyl groups are preferred. While the diols must have aliphatic hydroxyl groups, diols containing aromatic rings such as 1,4-di(β-hydroxyethoxy)benzene, are suitable. Illustrative diols include 1,4-butanediol, ethylene glycol, 1,2-propanediol, 1,3-propanediol, neopentyl glycol, cis and trans-1,4-dihydroxycyclohexane and 1,4-di(β-hydroxyethoxy)benzene, 1,3-butanediol, 2-methyl-2-ethyl-1,3-propanediol, 2-methylbutanediol-1,4, 2-butyl-2-ethylpropanediol-1,3 and 2-alloxymethyl-2-methylpropanediol-1,3. Preferred diols include 1,4-butanediol, ethylene glycol and 1,4-di(β-hydroxyethoxy)benzene. The preferred proportion of the curing diol is equivalent to 90–105% of the diisocyanate in excess of the polymeric glycol.

The polyfunctional blocking agents contemplated for use in the present invention may contain groups such as hindered secondary amino groups which can be represented by the general formula

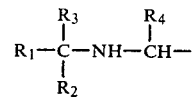

where $R_1$ and $R_2$ are alkyl, and $R_3$ and $R_4$ are hydrogen or alkyl; phenolic hydroxy groups; oxime groups; or hydroxamic acid groups.

Examples of suitable polyfunctional blocking agents containing hindered secondary amino groups include (1) polyamines prepared by the addition of secondary and tertiary amines to polyacrylate and polymethacrylate esters of low molecular weight polyols having three or more hydroxyl groups such as the addition product of three moles of t-butylamine to one mole of trimethylolpropane triacrylate and (2) polyamines prepared by vinyl polymerization of hindered amino group-containing vinyl monomers such as t-butylaminoethyl methacrylate and a variety of monomers which can be prepared by adding less than equivalent amounts of secondary and tertiary amines to polyacrylate esters so that at least one double bond will still be available for vinyl polymerization.

Examples of suitable polyfunctional blocking agents containing phenolic hydroxy groups include (1) substantially uncrosslinked phenol/aldehyde resins having at least three hydroxyl groups prepared by condensation of phenol or substituted phenols such as cresol or t-butylphenol with lower aldehydes such as formaldehyde and acetaldehyde, (2) polyesters of p-and m-hydroxybenzoic acids with low molecular weight polyols having at least three hydroxy groups; for example, the tri(4-hydroxybenzoate) of trimethylolpropane, (3) commercial polyfunctional phenolic antioxidants such as 1,3,5-trimethyl-2,4,6-tri(3,5-di-t-butyl-4-hydroxybenzyl) benzene and (4) polyphenols such as phloroglucinol.

Typical polyfunctional blocking agents containing oxime groups or hydroxamic acid groups can be prepared by reacting hydroxylamine with the carbonyl groups in certain polymers such as terpolymers of ethylene, methyl acrylate and carbon monoxide to yield a polyoxime or by reacting hydroxylamine with the ester groups of a dipolymer of ethylene and methyl acrylate to yield a polyhydroxamic acid.

Preferred blocking agents include substantially uncrosslinked phenol/formaldehyde resins and the polymers of t-butylaminoethyl methacrylate. These polymeric materials are soluble in the starting glycol-diisocyanate mixtures, either at room temperature or with heating.

Reactions of the isocyanate groups with the blocking agents containing secondary amino groups occur spontaneously. When both the blocking agent and the diol curing agent are present in the reaction medium, the blocking agent reacts preferentially, so that premature curing with the diol does not occur. The nonbasic polyfunctional blocking agents, however would not selectively react with the isocyanates in the presence of the aliphatic diol. When both such a blocking agent and the curing diol are present in the reaction medium, it is necessary to catalyze the blocking reaction. Suitable catalysts are tertiary amines. These can be aliphatic, aromatic, cycloaliphatic, or mixed and should not be substituted with strongly electron-withdrawing (e.g., —NO or —NO$_2$) groups. Suitable catalysts include, for example, tributylamine, N,N-dimethylaniline, N-ethylmorpholine, triethylenediamine, and N,N-dimethylcyclohexylamine. The amount of the catalyst usually will be about 0.001 to 0.5% based on the combined weight of compounds (A) and (B), preferably 0.003 to 0.1%.

It is to be noted that phenolic hydroxy groups, oxime groups, and hydroxamic acid groups react with the —NCO groups even in the absence of a catalyst, so that it is not necessary to use catalysts when the curing diol is absent during the isocyanate-blocking reactions.

As follows from the Summary of the Invention, the process of the present invention can be carried out in one step, by starting with all four components (A), (B), (C), and (D); or, for example, with a mixture of (C) and (D) with a polyurethane prepolymer obtained in a separate reaction of (A) with (B); or with a mixture of (D) with the blocked polyurethane prepolymer obtained in two separate reactions by first forming the prepolymer from (A) and (B), then blocking it with (C); or with a mixture of (D) with a blocked prepolymer obtained in a separate reaction from a mixture of (A), (B), and (C). Irrespective of the process variant, the overall chemical structures and physical properties of the cured polyurethanes prepared by these alternative different routes are sufficiently close to make these materials virtually undistinguishable from one another. In all these process variants the blocking agent (C) reacts before the curing agent (D) and, if the stoichiometry is such that the blocked isocyanate groups are unblocked, eventually a mixture of the cured polyurethane with the free blocking agent or with a derivative or degradation product of the blocking agent is obtained. Not all the blocked groups will always necessarily unblock, depending to a large extent on the relative proportions of the blocking agent and of the diol as well as on the process conditions, especially temperatures. The resulting polymer may thus not be completely linear but may contain a small proportion of crosslinks. While for most applications a completely linear polyurethane elastomer is preferred, the partly crosslinked polyurethane also is a useful product. It is particularly suitable for use in those applications where it may come in contact with organic liquids which would dissolve or swell a linear polyurethane to a greater extent.

The process of the present invention can be carried out within a temperature range of about 25°–150° C., usually about 80°–130° C. The same temperature range can be maintained during the molding stage and the post-cure stage; however the molding and the post-cure temperatures need not be identical. Using the present process, a shaped polyurethane article can be removed from the mold in 20–50% the time required in the absence of a polyfunctional blocking agent. The post-cure step normally requires several hours. Post-cure temperatures at the lower end of the acceptable range, that is, near 25° C., are possible with such polyfunctional blocking agents as, for example, the hindered secondary amines, which are readily displaced by the curing diol.

The polyurethane prepolymer, which may be used as one of the starting materials according to one of the process variants is made from components (A) and (B) in the presence or absence of a catalyst in a manner generally known in the art. A typical prepolymer preparation may follow, for example, the teachings of U.S. Pat. No. 3,752,790 to McShane. In order to avoid premature cure in the molding step and instability on storage, it is preferred not to use a catalyst in the prepolymer preparation.

Similarly, the reaction of the prepolymer with a blocking agent preferably is not catalyzed, so that the fabricator, who may be in a different location, may add the type and amount of catalyst of his choice with the curing diol and carrying out the last step of the process according to his preference.

The blocked polyurethane prepolymers of the present invention are valuable intermediates which can be formulated with any suitable curing agents and optionally with catalysts and cured to polyurethane articles. The blocked prepolymers which are supplied by the chemical manufacturer to the user for molding and curing thus are useful articles of commerce.

This invention is now illustrated by the following examples of certain representative embodiments thereof, where all parts, proportions, and percentages are by weight unless otherwise indicated.

Physical property data were obtained according to the following ASTM procedures:

| | |
|---|---|
| Modulus at 100% elongation, $M_{100}$ | D412 |
| Modulus at 300% elongation, $M_{300}$ | D412 |
| Modulus at 500% elongation, $M_{500}$ | D412 |
| Tensile at break, $T_B$ | D412 |
| Elongation, $E_B$ | D412 |
| Hardness, Shore A and D | D2240 |
| Bashore Resilience | D2632 |
| Compression set | D395 |
| Tear, die C | D624 |
| Trouser tear | D470 |

The 180° C. bend test is employed as a rapid means for determining the state of cure of a molded polyurethane. The test is conducted on a molded polyurethane test slab within 30 seconds of opening the mold, while the slab is still hot upon removal from the mold. The test is conducted by lifting one corner of a 6 in.×6 in.×75-mil (15.2 cm×15.2 cm×0.1905 cm) molded slab of polyurethane and bending the corner over until it touches the upper surface of the slab and while maintaining the corner in contact with the surface of the slab, pressing down on the resulting fold. A very poorly cured sample will break at the fold. A well-cured sample upon release will return essentially to its original shape and there will be no significant mark or crease where the fold was pressed. Cracking at the bend without breaking or evident creasing at the bend indicate an incomplete cure.

EXAMPLE 1

A prepolymer is prepared by reacting in the absence of a catalyst, at 100° C., 3.3 moles of 4,4'-methylenebis(phenyl isocyanate) with 1.0 mole of poly(tetramethylene ether) glycol having a number average molecular weight of about 1000. The prepolymer has an NCO content of 10.1%. The prepolymer is cured with 1,4-butanediol, optionally in combination with a soluble phenol-formaldehyde resin having a molecular weight of about 1200 (Resinox ® 753, sold by Monsanto Chemical Company), in the presence of triethylenediamine catalyst. The amounts of materials used are shown in Table Ia.

TABLE Ia

| | Parts | | | |
|---|---|---|---|---|
| Ingredients | 1-A | 1-B | 1-C (Control) | 1-D (Control) |
| Prepolymer | 100 | 100 | 100 | 100 |
| Phenol-formal- | 1.29 | 1.29 | — | — |

TABLE Ia-continued

| | Parts | | | |
|---|---|---|---|---|
| Ingredients | 1-A | 1-B | 1-C (Control) | 1-D (Control) |
| dehyde resin | | | | |
| 1,4-Butanediol | 9.67 | 10.8 | 10.8 | 9.67 |
| Triethylene-diamine, 33% solution in isopropyl alcohol | 0.03 | 0.03 | 0.03 | 0.03 |

The phenol/formaldehyde resin is dissolved in the prepolymer by heating to 110° C. The resulting solutions are cooled to 50° C., at which point most of the resin has not reacted. Butanediol and triethylenediamine catalyst are then added, and the mixtures are degassed by agitating at 70° C. under reduced pressure. The mixtures are poured into molds preheated to 110° C. The molds are maintained at 110° C. until the samples can be demolded without breaking or tearing. Samples 1-A and 1-B can be demolded in 8 and 10 minutes, respectively, while Sample 1-C cannot be demolded before at least 30 minutes, and Sample 1-D cannot be demolded at all. Sample 1-A is cured with 90% of the theoretical amount of butanediol required to react with all of the NCO originally contained in the prepolymer, while Sample 1-B is cured with the theoretical amount of butanediol. Control Sample 1-C is cured with butanediol alone in the theoretical amount. Control Sample 1-D is cured with butanediol alone at a level of 90% of the calculated amount. Portions of Samples 1-A, 1-B and 1-C are tested after being demolded with and without post-curing for 16 hours at 110° C. The results of these physical tests are shown in Table Ib.

TABLE Ib

| | Sample | | |
|---|---|---|---|
| | 1-A | 1-B | 1-C |
| Physical Properties After Mold Cure Only | | | |
| Hardness A | 93 | 92 | 92 |
| Hardness D | 51 | 49 | 52 |
| $M_{100}$, MPa | 14.97 | 13.08 | 13.08 |
| $M_{300}$, MPa | — | 27.54 | 24.62 |
| $T_B$, MPa | 29.09 | 27.54 | 46.14 |
| $E_B$, % | 280 | 300 | 450 |
| Permanent Set, % | 17 | 28 | 46 |
| Tear D470, kN/m | 13.5 | 18.94 | 27.01 |
| Compression Set 22 hrs./70° C. | 61 | 55 | 37 |
| Bashore Resilience | 41 | 39 | 43 |
| Physical Properties After Post Cure for 16 hrs./110° C. | | | |
| Hardness A | 92 | 91 | 92 |
| Hardness D | 47 | 47 | 48 |
| $M_{100}$, MPa | 14.11 | 12.56 | 13.08 |
| $M_{300}$, MPa | 38.56 | 25.82 | 26.17 |
| $T_B$, MPa | 39.60 | 36.84 | 36.50 |
| $E_B$, % | 300 | 380 | 380 |
| Permanent Set, % | 20 | 34 | 37 |
| Tear D470, kN/m | 11.92 | 23.50 | 23.68 |
| Compression Set 22 hrs./70° C. | 51 | 36 | 36 |
| Bashore Resilience | 38 | 37 | 39 |

It can be seen from the above data that samples 1-B and 1-C, both cured with the calculated amount of 1,4-butanediol, after post-cure have similar physical properties. Following the molding step, but before post-cure, sample 1-B, made from a composition containing phenol/formaldehyde resin, has the physical properties of a crosslinked product, while control sample 1-C, made without the resin, is a typical undercured product. Sample 1-A, cured with less than the theoretical amount of 1,4-butanediol, remains crosslinked even after post-cure, as evidenced by its lower tear strength and elongation.

EXAMPLE 2

An isocyanate-terminated prepolymer prepared from 4,4'-methylenebis(phenyl isocyanate) and poly(ethylene adipate) glycol and having an NCO content of 6.3% (Multrathane® F-242 sold by Mobay) is modified by reacting it with the phenol-formaldehyde resin of Example 1 in the presence of triethylenediamine catalyst. The phenol-formaldehyde resin is dissolved by heating the reacting mixture to 110° C. for 10 minutes. A complete reaction of the resin takes place during this period. This modified prepolymer is cured with different proportions of ethylene glycol. Control runs with the unmodified prepolymer also are made. The amounts of materials used are shown in Table IIa. The "NCO equivalents, %" figures indicate what percentage of the NCO groups in the original unmodified prepolymer would be cured by the amount of ethylene glycol added.

TABLE IIa

| | Run | | | |
|---|---|---|---|---|
| | A | B | C | D |
| Prepolymer, parts | 100 | 100 | 100 | 100 |
| Phenol-formaldehyde resin, parts | 1.6 | 1.6 | 1.6 | 1.6 |
| Triethylenediamine, parts | 0.1 | 0.1 | 0.1 | 0.1 |
| Ethylene glycol (parts (NCO equivalents, %) | 4.83 105 | 4.6 100 | 4.37 95 | 4.14 90 |

| | Run | | |
|---|---|---|---|
| | E | F | G |
| Prepolymer, parts | 100 | 100 | 100 |
| Phenol-formaldehyde resin, parts | — | — | — |
| Triethylenediamine, parts | 0.1 | 0.1 | 0.1 |
| Ethylene glycol (parts (NCO equivalents, %) | 4.83 105 | 4.6 100 | 4.37 95 |

The samples are prepared by mixing the ethylene glycol with the modified or unmodified prepolymer at 70° C. and degassing the mixture at 70° C., after which the mixture is poured into molds preheated to 110° C. Samples are demolded after one hour at 110° C. and tested by subjecting them to the 180° bend test. All samples except G pass the bend test after the one-hour mold cure. Physical properties are determined on portions of the cooled samples without further cure and also on portions after post-curing for 72 hours at 110° C.

The test data are shown in Table IIb. Data for Sample G are not included because the sample did not cure.

TABLE IIb

| Physical Properties | A | B | C |
|---|---|---|---|
| No Post Cure | | | |
| Hardness A | 79 | 77 | 79 |
| Hardness D | 26 | 31 | 33 |
| 100% Modulus, MPa | 4.6 | 4.8 | 5.5 |
| 300% Modulus, MPa | 8.4 | 10.2 | 12.8 |
| Tensile Strength, MPa | 12.8 | 21.9 | 29.5 |

TABLE IIb-continued

| | | | |
|---|---|---|---|
| Elongation at Break, % | 425 | 495 | 490 |
| Tear Strength, D470 kN/m | 11.6 | 14.7 | 13.9 |
| Compression Set (Method B) 22 hrs./70° C. % | 83 | 79 | 68 |
| Bashore Resilience | 27 | 25 | 23 |
| Post Cured 72 hrs. at 110° C. | | | |
| Hardness A | 74 | 73 | 75 |
| Hardness D | 28 | 31 | 31 |
| 100% Modulus, MPa | 4.2 | 4.7 | 4.6 |
| 300% Modulus, MPa | 9.1 | 10.7 | 12.9 |
| Tensile Strength, MPa | 14.8 | 25.0 | 34.6 |
| Elongation at Break, % | 450 | 585 | 575 |
| Tear Strength, D470 kN/m | 19.5 | 21.2 | 20.7 |
| Compression Set (Method B) 22 hrs./70°C., % | 69 | 66 | 45 |
| Bashore Resilience | 24 | 26 | 22 |

| Physical Properties | D | E | F |
|---|---|---|---|
| No Post Cure | | | |
| Hardness A | 79 | 82 | 83 |
| Hardness D | 33 | 38 | 37 |
| 100% Modulus, MPa | 6.4 | 5.7 | 5.9 |
| 300% Modulus, MPa | 21.0 | 12.1 | 13.3 |
| Tensile Strength, MPa | 32.1 | 38.0 | 46.7 |
| Elongation at Break, % | 365 | 630 | 640 |
| Tear Strength, D470 kN/m | 15.4 | 22.6 | 21.5 |
| Compression Set (Method B) 22 hrs./70° C., % | 59 | 52 | 48 |
| Bashore Resilience | 22 | 38 | 34 |
| Post Cured 72 hrs. at 110° C. | | | |
| Hardness A | 73 | 81 | 77 |
| Hardness D | 30 | 34 | 33 |
| 100% Modulus, MPa | 4.5 | 4.9 | 4.8 |
| 300% Modulus, MPa | 12.2 | 11.9 | 11.6 |
| Tensile Strength, MPa | 33.6 | 33.4 | 40.5 |
| Elongation at Break, % | 560 | 665 | 720 |
| Tear Strength, D470 kN/m | 22.2 | 23.5 | 25.1 |
| Compression Set (Method B) 22 hrs./70° C., % | 44 | 47 | 48 |
| Bashore Resilience | 20 | 35 | 33 |

EXAMPLE 3

Cured polyurethane samples are prepared substantially as described in Example 2 employing the quantities shown in Table III. Minimum demold time is determined for each sample as the minimum time at which the sample passes the 180° bend test without breaking. Table III shows the minimum demold times observed and physical properties of the samples after a 72-hour post-cure at 110° C.

TABLE III

| | A | B | C | D |
|---|---|---|---|---|
| Prepolymer, parts | 100 | 100 | 100 | 100 |
| Phenol-formaldehyde resin, parts | 1.6 | 1.6 | 1.6 | 1.6 |
| Ethylene glycol, parts | 4.6 | 4.46 | 4.14 | 4.83 |
| NCO equivalents, % | 100 | 97 | 90 | 105 |
| Minimum demold-time, Minutes | 29 | 27 | 45 | 21 |
| Hardness A | 77 | 79 | 76 | 81 |
| Hardness D | 33 | 34 | 32 | 34 |
| 100% Modulus, MPA | 5.7 | 5.9 | 5.4 | 5.0 |
| 300% Modulus, MPA | 13.8 | 15.2 | 17.4 | 10.3 |
| Tensile Strength, MPa | 41.7 | 25.0 | 38.0 | 13.7 |
| Elongation at Break, % | 550 | 390 | 480 | 390 |
| Tear Strength, D-470, kN/m | 21.9 | 22.8 | 17.0 | 21.0 |
| Compression Set (Method B) 22 hrs/70° C., % | 43 | 26 | 25 | 33 |

| | Controls | | | |
|---|---|---|---|---|
| | E | F | G | H |
| Prepolymer, parts | 100 | 100 | 100 | 100 |
| Phenol-formaldehyde resin, parts | — | — | — | — |
| Ethylene glycol, parts | 4.6 | 4.46 | 4.14 | 4.83 |
| NCO equivalents, % | 100 | 97 | 90 | 105 |
| Minimum demold-time, Minutes | >65 | >75 | >80 | >60 |
| Hardness A | 82 | 81 | 80 | — |
| Hardness D | 36 | 34 | 33 | — |
| 100% Modulus, MPA | 5.8 | 5.5 | 5.3 | 5.5 |
| 300% Modulus, MPA | 12.8 | 13.8 | 12.6 | 13.2 |
| Tensile Strength, MPa | 47.9 | 38.0 | 55.9 | 21.6 |
| Elongation at Break, % | 550 | 480 | 500 | 390 |
| Tear Strength, D-470, kN/m | 23.5 | 23.5 | 10.5 | 23.3 |
| Comp. Set (Method B) 22 hrs/70° C., % | 25 | 21 | 17 | — |

The demold times of compositions A through D are significantly shorter than the demold times of prior art compositions E through H. After post-cure, the properties of compositions A through D are quite acceptable.

EXAMPLE 4

The prepolymer of Example 1 is modified by adding to 17,114 g of the prepolymer a solution of 8.6 g of azobisisobutyronitrile in 376.5 g (2.2 phr) of t-butylaminoethyl methacrylate with stirring. The resulting mixture is heated to 110° in a degasser and held for 10 minutes to effect the acrylate polymerization. This modified prepolymer is cured with a mixture of butanediol and trimethylolpropane in the presence of triethylenediamine as catalyst, the respective weight proportions of these components being 97/3/0.3.

Samples are cured with different proportions of the curing mixture as shown in Table IV below, and are tested after mold cure only for 1 hour at 110° C. and after a 16-hour post-cure at 110° C. All the procedures are those of Example 1. The physical properties of the samples are shown in Table IV.

TABLE IV

| | A | B | C |
|---|---|---|---|
| Curing Agent, NCO equivalents, % | 92 | 88 | 99 |
| Mold Cure Only | | | |
| Hardness A | 93 | 93 | 93 |
| Hardness D | 49 | 50 | 49 |
| 100% Modulus, MPa | 14.3 | 14.3 | 13.2 |
| 300% Modulus, MPa | 22.7 | 22.5 | 17.4 |
| Tensile Strength, MPa | 36.5 | 36.0 | 24.2 |
| Elongation at Break, % | 435 | 440 | 490 |
| Tear Strength, D470 kN/m | 25.2 | 20.5 | 23.8 |
| Tear Die C | 84.1 | 84.8 | 86 |
| Compression Set (Method B) 22 hrs./70° C., % | 63 | — | — |
| Post-Cured 16 hrs./110° | | | |
| Hardness A | 92 | 93 | 93 |
| Hardness D | 47 | 47 | 48 |
| 100% Modulus, MPa | 13.0 | 12.8 | 13.0 |
| 300% Modulus, MPa | 21.1 | 20.7 | 20.2 |
| Tensile Strength, MPa | 39.5 | 30.8 | 40.1 |
| Elongation at Break, % | 455 | 400 | 480 |
| Tear Strength, D470 | 27.5 | — | — |
| Tear Die C | 95.4 | 90.4 | 95.4 |
| Compression Set (Method B) | 56 | — | 52 |

TABLE IV-continued

|  | A | B | C |
|---|---|---|---|
| 22 hrs./70° C., % | | | |

All the samples have adequate physical properties.

EXAMPLE 5

A prepolymer is prepared by reacting 3.0 moles of 4,4'-methylenebis(phenyl isocyanate) with 1.0 mole of poly(tetramethylene ether)glycol having a number average molecular weight of about 1000. The prepolymer has an NCO content of 9.3%. It is cured with a combination of diols and a hindered triamine (trimethylolpropane tri-$\beta$-t-butylaminopropionate), hereafter, BATA. BATA is prepared by adding 3 moles of t-butylamine to 1 mole of trimethylolpropane triacrylate and letting the mixture stand overnight. At the end of this period, no unsaturation remains in the product. The amounts of materials used are shown in Table Va. The percentages given in the table represent the percentage of the NCO groups in the prepolymer which would theoretically react with the various curing agents.

TABLE Va

|  |  | Controls |  |  |
|---|---|---|---|---|
| Component, parts (%) | A | B | C | D |
| Prepolymer | 100 | 100 | 100 | 100 |
| BATA (%) | 3.49 (10%) | — | — | 3.7 (10%) |
| 1,4-Butanediol (%) | 8.05 (80%) | 8.46 (85%) | 9.46 (95%) | 8.46 (85%) |
| Dipropylene glycol (%) | — | 1.48 (10%) | — | 1.48 (10%) |
| Total (%) | (90%) | (95%) | (95%) | (105%) |

The prepolymer is heated to 110° C. and BATA is added slowly with rapid stirring over a period of 5 minutes. The mixture is cooled to 55° C.; the diols are added; and the mixture is further mixed, degassed, and poured into molds preheated to 110° C. The molds are maintained at 110° C. for 30 minutes; then, the samples are demolded. Samples A and D can be demolded without breaking. The control samples B and C, break, however. Portions of demolded samples A, B, C, and D are tested with and without post-curing 16 hours at 110° C. The physical properties shown in Table Vb indicate that sample D has lower tear strength and elongation before post-curing than after. Samples B and C follow the normal pattern expected for prior art polyurethanes of decreasing tear strengths and elongations with post-curing.

TABLE Vb

| Sample | A | B | C | D |
|---|---|---|---|---|
| Demolding Behavior | Strong and Flexible, Passes Bend Test | Cheesy, Breaks | Cheesy, Breaks | Strong and Flexible, Passes Bend Test |
| Mold Cure Only | | | | |
| Modulus $M_{100}$, MPa | — | 9.0 | 11.0 | 7.6 |
| Modulus $M_{200}$, MPa | — | 11.4 | 13.4 | 10.0 |
| Modulus $M_{300}$, MPa | — | 14.1 | 15.9 | 12.4 |
| Tensile Strength $T_B$, MPa | — | 29.0 | 26.9 | 30.7 |
| Elongation Break $E_B$, % | — | 690 | 620 | 610 |
| Tear Strength D-470, Tear, kN/m | — | 24.9 | 31.5 | 19.3 |
| Post Cured 16 hours/110° | | | | |
| Modulus $M_{100}$, MPa | 6.9 | 7.9 | 9.7 | 6.9 |
| Modulus $M_{200}$, MPa | 9.3 | 11.4 | 13.1 | 8.6 |
| Modulus $M_{300}$, MPa | 11.7 | 15.9 | 17.2 | 10.0 |
| Tensile Strength $T_B$, MPa | 31.0 | 48.3 | 31.7 | 15.2 |
| Elongation of Break $E_B$, % | 620 | 570 | 480 | 660 |
| Tear Strength D-470 Tear, kN/m | 22.8 | 22.8 | 23.6 | 23.6 |

I claim:

1. A curable polyurethane prepolymer composition consisting essentially of a reaction product of the following components (A) and (C) with (B):
   (A) 1 mole of a polymeric glycol having a number average molecular weight of about 400–3000;
   (B) at least 1.3 moles of an organic diisocyanate; and
   (C) a blocking agent having at least three active hydrogen groups per molecule capable of reacting with isocyanate groups, the proportion of the blocking agent being about 0.01 to 0.15 active hydrogen equivalent per equivalent of isocyanate groups in excess of hydroxyl groups.
   with the proviso that when the blocking agent is a phenol/aldehyde resin, its proportion is at most 5% by weight of component (A).

2. A composition of claim 1 which is one of the following:
   (1) a reaction product of a mixture of components (A) and (C) with (B),
   (2) a reaction product of component (A) with a reaction product of components (B) and (C),
   (3) a reaction product of component (C) with a reaction product of components (A) and (B).

3. A composition of claim 1 wherein the proportion of the diisocyanate is 1.5–6 moles per mole of polymeric glycol.

4. A composition of claim 3 wherein the polymeric glycol has a number average molecular weight of about 600–2000.

5. A composition of claim 4 wherein the polymeric glycol is polytetramethylene ether glycol.

6. A composition of claim 1 wherein the diisocyanate is selected from the group consisting of 4,4-methylenebis(phenyl isocyanate), 2,4-tolylene diisocyanate, 2,6-tolylene diisocyanate, and mixtures of 2,4- and 2,6-tolylene diisocyanates.

7. A composition of claim 1 wherein the blocking agent is a substantially uncrosslinked phenol/aldehyde resin having at least three hydroxyl groups.

8. A composition of claim 7 wherein the phenol/aldehyde resin is a phenol/formaldehyde resin.

9. A composition of claim 1 also containing a diol having aliphatic hydroxyl groups and a molecular weight of less than about 250, the amount of the diol being equivalent to about 75–120% of the diisocyanate (B) in excess of the polymeric glycol (A).

10. A composition of claim 9 wherein the amount of the diol is equivalent to 90–105% of the diisocyanate (B) in excess of the polymeric glycol (A).

11. A process for making cured polyurethane elastomer articles, said process comprising the following two steps:
   (1) the following composition is blended together and molded at a sufficiently high temperature to crosslink the prepolymer, thereby to impart to the shaped article adequate mechanical integrity to permit the article to be demolded prior to complete cure:
   (A) 1 mole of a polymeric glycol having a number average molecular weight of about 400–3000;
   (B) at least 1.3 moles of an organic diisocyanate;
   (C) about 0.01 to 0.15 equivalent of an isocyanate-blocking agent having at least three active hydrogen groups per equivalent of isocyanate groups in excess of hydroxyl groups;
   with the proviso that when the blocking agent is a phenol/aldehyde resin, its proportion is at most 5% by weight of component (A); and
   (D) a diol having aliphatic hydroxyl groups and a molecular weight of less than about 250,
   the amount of the diol being equivalent to at least 75%, but no more than about 120%, of the diisocyanate (B) in excess of the polymeric glycol (A); and
   (2) the crosslinked molded article is demolded and maintained at a temperature of about 25°–150° C. until cure is completed;
   with the proviso that, instead of a mixture of components (A), (B), (C), and (D), one can use a mixture of (D) or of (D) and one of (A) and (C) with the product of a one-step or a two-step reaction of the remaining components with one another.

12. A process of claim 11 wherein the molding temperature is about 100°–120° C.

13. A process of claim 11 wherein the proportion of the diisocyanate is 1.5–6 moles per mole of polymeric glycol.

14. A process of claim 13 wherein the proportion of the curing diol is equivalent to 90–105% of the diisocyanate in excess of the polymeric glycol.

15. A process of claim 11 wherein the diisocyanate is methylenebis(4,4'-phenyl isocyanate).

16. A process of claim 15 wherein the isocyanate blocking agent is a substantially uncrosslinked phenol/formaldehyde resin having at least three hydroxyl groups.

17. The process of claim 11 wherein a nonbasic blocking agent (C) and the diol (D) are present in the blend of step (1) at the same time, and a tertiary amine catalyst is used to selectivity catalyze the isocyanate-blocking reaction.

18. A process of claim 17 wherein the amount of the catalyst is about 0.001–0.5% based on the combined weights of polymeric glycol (A) and organic diisocyanate (B).

19. A process of claim 18, wherein the proportion of the catalyst is 0.003–0.1% of the combined weights of (A) and (B).

20. A process of claim 11 wherein the proportion of diol (D) is sufficient to displace substantially all of the blocking agent from the blocking agent-diisocyanate reaction product.

21. A process of claim 11 wherein the proportion of diol (D) is insufficient to displace substantially all of the blocking agent from the blocking agent-diisocyanate reaction product.

* * * * *